United States Patent [19]

Ishikawa et al.

[11] 4,005,401
[45] Jan. 25, 1977

[54] ELECTRICAL SWITCH FOR A BRAKING FLUID PRESSURE FAULT ALARM DEVICE

[75] Inventors: Masakazu Ishikawa, Toyota; Takaaki Ota, Okazaki; Noriakira Ishigami, Chiryu; Asao Kozakai, Anjyo, all of Japan

[73] Assignee: Toyota Jidosha Kogyo Kabushiki Kaisha, Japan

[22] Filed: May 21, 1975

[21] Appl. No.: 579,689

[30] Foreign Application Priority Data

May 22, 1974 Japan .............................. 49-59071

[52] U.S. Cl. .......................... 340/52 C; 200/82 D; 303/6 C; 340/242
[51] Int. Cl.[2] .................. B60T 17/22; H01H 35/38
[58] Field of Search .................. 340/52 C, 60, 242; 188/151 A; 303/6 C, 84 A; 200/82 R, 82 D; 60/534

[56] References Cited

UNITED STATES PATENTS

| | | | |
|---|---|---|---|
| 2,310,261 | 2/1943 | Schwarzhaupt et al. | 200/82 R |
| 2,891,120 | 6/1959 | Saholt | 200/82 R |
| 3,394,401 | 7/1968 | Roberts | 200/82 |
| 3,632,924 | 1/1972 | Harper | 200/82 D |
| 3,709,563 | 1/1973 | Shellhause | 303/6 C |
| 3,810,142 | 5/1974 | Ito | 340/242 |
| 3,811,021 | 5/1974 | Ito | 200/82 D |

Primary Examiner—Donald J. Yusko
Assistant Examiner—Joseph E. Nowicki
Attorney, Agent, or Firm—Toren, McGeady and Stanger

[57] ABSTRACT

An electric switch for use in a braking fluid pressure fault alarm device for a vehicular dual brake system, which device includes a body having a cylinder, a piston slidably inserted in the cylinder and receiving front and rear wheel braking fluid pressures for sliding movement from its inoperative position to its operative position in response to leakage of either of the braking fluid pressures, and an electric alarm circuit for generating an alarm signal when deenergized. The electric switch is engaged with the piston and is switched from its conductive condition to its non-conductive condition in response to sliding movement of the piston in order to deenergize the electric alarm circuit. This electric switch comprises a switch body having a stepped through bore, an annular support fixedly mounted in the switch body, an insulating terminal holder fixedly mounted in the switch body, a conductive plate disposed in the terminal holder, a terminal fixedly mounted in the terminal holder, a weak spring disposed in the terminal holder for biasing the plate into abutting engagement with the support, a plunger inserted in the switch body, and a spring interposed between the plunger and the support and compressed to be loaded at a preset level so as to bias the plunger apart from the plate. Thus, the plunger can be moved, in response to the sliding movement of the piston, from the inoperative position toward the plate to bring its insulating end portion into abutment engagement with the plate to thereby separate the plate from the support.

9 Claims, 2 Drawing Figures

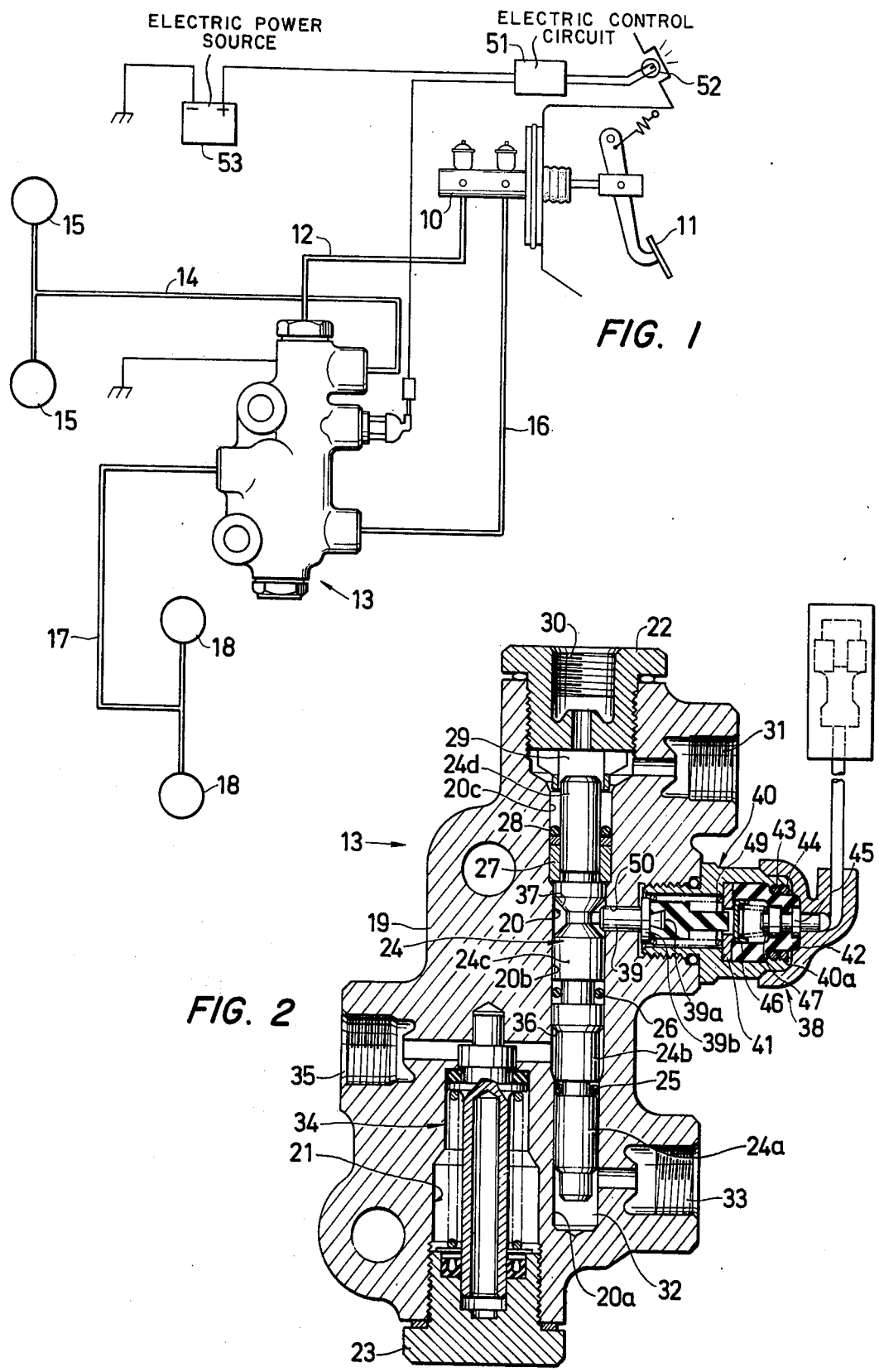

ELECTRICAL SWITCH FOR A BRAKING FLUID PRESSURE FAULT ALARM DEVICE

BACKGROUND OF THE INVENTION

The present invention relates to a braking fluid pressure fault alarm device for a vehicular dual brake system, which is used to provide an alarm signal to a vehicular driver when leakage takes place in the braking fluid pressure due to damage in the dual brake system, and more particularly, to an electric switch for use in the fault alarm device.

SUMMARY OF THE INVENTION

It is accordingly an object of the present invention to provide an electric switch for use in a braking fluid pressure fault alarm device which is normally conductive but becomes non-conductive in response to the occurrence of leakage in the braking fluid pressure.

It is another object of the present invention to provide a switch for a braking fluid pressure fault alarm device which operates securely and reliably and is simple to manufacture.

According to a major aspect of the present invention, there is disclosed an electric switch for use in a braking fluid pressure fault alarm device for a vehicular dual brake system. The fault alarm device includes a fluid control body having a cylinder defined therein, a piston slidably inserted in the cylinder and receiving pressures from front and rear wheel braking fluid systems for sliding movement from an initial inoperative position to a second operative position in response to leakage of either of the braking fluid systems, and an electric alarm circuit for generating an alarm signal when it is deenergized. The electric switch of the invention is engaged with the piston for being switched from a normal conductive condition to an actuated non-conductive condition in response to sliding movement of the piston so as to deenergize the electric alarm circuit. This electric switch includes a switch body screwed into the body of the fault alarm device and being in electrical contact therewith. This switch body is formed with a stepped through bore having larger and smaller diameter portions. The electric switch further includes an annular plate-like support fixedly mounted in the larger diameter portion of the switch body and being in electrical contact therewith. Also included is an electrically insulating terminal holder fixedly mounted in the larger diameter portion of the switch body and formed with a recess facing the support, an electrically conductive plate disposed in the recess of the terminal holder, a terminal fixedly mounted in a central portion of the terminal holder, a weak first spring disposed in the recess of the terminal holder for biasing the plate into abutting engagement with the support and for providing electrical contact between the terminal and plate, a plunger inserted in the smaller diameter of the switch body and having an electrically insulating end portion, and a second spring interposed between the plunger and the support and in a state of compression. The second spring is loaded at a preset level so as to bias the plunger in the direction away from the plate. Thus, the plunger can be moved, in response to the sliding movement of the piston from its inoperative position, toward the plate to bring its end portion into abutting engagement with the plate to thereby separate the plate from the support.

For a better understanding of the present invention together with further objects thereof, reference is made to the following description and accompanying drawings while the scope of the present invention will be pointed out in the appended claims.

BRIEF DESCRIPTION OF THE DRAWINGS

In the drawings:

FIG. 1 is an overall flow chart in partially schematic form showing a braking fluid pressure fault alarm device incorporating therein an electric switch according to the present invention; and FIG. 2 is a longitudinal sectional view showing an essential portion of FIG. 1, including the electric switch with a coactive combination valve.

DESCRIPTION OF THE PREFERRED EMBODIMENT

Referring initially to FIG. 1, a tandem master cylinder 10 for a vehicle dual brake system is operatively connected with a brake foot pedal 11 to establish on its braking chambers, when the brake pedal 11 is depressed, fluid pressures which vary with the variation in depression of the brake pedal 11. The front wheel braking fluid pressure thus established in one of the pressure chambers is then introduced through a conduit 12, a combination valve or fluid control element 13 and a conduit 14 into a pair of front wheel cylinders 15. The rear wheel braking fluid pressure from the other pressure chamber of the tandem master cylinder 10 is introduced through a conduit 16, the combination valve 13 and a conduit 17 into a pair of rear wheel cylinders 18.

The details of the combination valve 13 will now be described with reference to FIG. 2. A body 19 of the combination valve of the fluid control element 13 is formed with a stepped cylinder 20, which has its upper end open, and with a stepped cylinder 21, which has its lower end open. The opening of the stepped cylinder 20 is closed by a plug 22, which is fixedly screwed into the body 19, and the opening of the stepped cylinder 21 is also closed by a plug 23 which is similarly fixed to the body 19. A stepped piston 24 is slidably inserted in the stepped cylinder 20 through a seal ring 25, which is fitted in the boundary between its small diameter lower piston portion 24a (which is thinner than a small diameter portion 20a of the stepped cylinder 20) and its medium diameter piston portion 24b and having a diameter to allow it to just fit in the small diameter portion 20a. The piston 24 is also slidably inserted through a seal ring 26 which is fitted on a lower end portion of its larger diameter portion 24c of the diameter and is of a size to just fit in a medium diameter portion 20b of the stepped cylinder 20. A sleeve 27 is slidably inserted in a tubular clearance between the outer circumference of a small diameter upper portion 24d of the stepped piston 24 and a larger diameter portion 20c of the stepped cylinder 20 and is slidable relative to both the stepped cylinder 20 and the stepped piston 24. A seal ring 28 is also fitted in the particular tubular clearance.

A fluid chamber 29, into which the upper end of the stepped piston 24 extends has fluid communication with the conduit 12 through a port 30, which is formed in the plug 22, and with the conduit 14 through a port 31 which is formed in the body 19. A fluid chamber 32, into which the lower end of the stepped piston 24 extends, is constructed to have fluid communication not only with the conduit 16 through a port 33 which is formed in the body 19, but also with a port 35 which is formed in the body 19, through a well known proportioning valve 34 which is disposed in the stepped cylinder 21. This port 35 further communicates not only with the conduit 17 but also with a cylindrical fluid chamber 36 which is formed between the medium diameter portion 24b of the stepped piston 24 and the medium diameter portion 20b of the stepped cylinder 20. This fluid chamber 36 attains fluid communication with the fluid chamber 32 through the clearance between the small diameter portion 24a of the stepped piston 24 and the small diameter portion 20a of the stepped cylinder 20 because the seal ring 25 is released from engagement with the smaller diameter portion 20a of the stepped cylinder 20 when the stepped piston 24 is made to slide upwardly from its inoperative position as shown in FIG. 2.

On the outer circumference of the stepped piston 24, in the vicinity of the upper end of the larger diameter portion 24c, is formed an annular groove 37 of substantially "V"-shaped cross section. Into the groove, a first or left end of a plunger 39 of an electric switch 38 mounted on the body 19 is inserted. This electric switch 38 includes a stepped cylindrical switch body 40 made of an electrically conductive material, which is secured to the body 19 by means of a screw formed on the outer circumference of its small diameter portion. In the inside of the larger diameter portion of the switch body 40 are fixed both an annular plate-like support 41 of an electrically conductive material, which has its outer diameter just fitted in the inner diameter of the larger diameter portion of the switch body 40, and a stepped cylindrical terminal holder 42 of an electrically insulating material. The stepped terminal holder 42 has its larger diameter portion of the outer diameter just fitted in the inner diameter of the larger diameter portion of the switch body 40. The fitting of the support 41 and the terminal holder 42 is effected under the condition where the support 41 is interposed between the terminal holder 42 and the step portion of the switch body 40, partly by fitting a ring 43 of an elastic material and an annular plate 44 on the outer circumference of the smaller diameter portion of the terminal holder 42 and partly by subjecting a thin second or right end 40a of the switch body 40 to a caulking treatment. A terminal 45 is cast into the smaller diameter portion of the terminal holder 42 at the center thereof. In the inside space of this terminal holder 42 are disposed both a plate 46 of an electrically conductive material, which is detachably engaged with the support 41, and a spring 47 which is interposed between the plate 46 and the terminal 45 to bias the plate 46 toward the support 41. Inside of the smaller diameter portion of the switch body 40 is included a spring 49 which is interposed between an electrically insulating right end portion 39a and a flange 39b of the plunger 39 and the support 42 and which is compressed, by screwing the switch body 40 into the body 19, so as to bias the plunger 39 in the leftward direction. The plunger 39 is slidably inserted in a bore 50 of the body 19 to bring its right end, when moved from the position as shown in FIG. 2, into abutting engagement with the plate 46 through the center bore of the support 41 and to disengage the same from the support 41. The terminal 45 of the electric switch 38 is, as shown in FIG. 1, connected with an electric control circuit 51, which makes use of an electronic element such as a transistor or the like to turn on an alarm lamp 52 when the electric switch 38 becomes non-conductive. Reference numeral 53 in FIG. 1 indicates an electric power source.

Thus, in operation, FIG. 2 depicts the normal condition, in which the braking fluid pressure circuits from the tandem master cylinder 10 to the front and rear wheel cylinders 15 and 18, respectively, and functions without any leakage of the braking oil pressure. In this normal condition, the sum of the downward force, which is established by the front wheel braking fluid pressure in the fluid chamber 29 urging the stepped piston 24 downwardly, and the downward force, which is established by the front wheel braking fluid pressure in the fluid chamber 29 urging the sleeve 27 downwardly, is larger than the sum of the upward force, which is established by the rear wheel braking fluid pressure in the fluid chamber 32 urging the stepped piston 24 upwardly, and the upward force which is established by the rear wheel braking fluid pressure in the fluid chamber 36 urging the stepped piston 24 upwardly. In this instance, therefore, the stepped piston 24 and the sleeve 27 are located at their inoperative positions as shown in FIG. 2 with the upper end face of the larger diameter portion 24c of the stepped piston abutting against the lower end face of the sleeve 27 and with the lower end face of the sleeve 27 abutting against the lower end shoulder face of the larger diameter portion 20c of the stepped cylinder 20. Here, it should be noted that the front wheel braking fluid pressure in the fluid chamber 29 is substantially equal to the rear wheel braking fluid pressure in the fluid chamber 32, and that the rear wheel braking fluid pressure in the fluid pressure 36 is substantially equal to that in the fluid chamber 32 at an initial stage of increase in the braking fluid pressure but is reduced by the proportioning valve 34 at a constant ratio relative to the fluid pressure in the fluid chamber 32 when the braking fluid pressure exceeds a predetermined level.

With these pressure relationships, when the front wheel braking fluid pressure circuit is damaged to allow leakage of the front wheel braking fluid pressure, the stepped piston 24 is made to slide upward from the inoperative position shown in FIG. 2, together with the sleeve 27, due to the difference between the front wheel braking fluid pressure and the rear wheel braking fluid pressure. As a result, the plunger 39 of the electric switch 38 is moved in the rightward direction from the position shown by the camming action of one of the sloped surfaces of the groove 37 so as to bring its right end into abutting engagement with the plate 46. Plate 46 thereby moves in a rightward direction out of engagement with the support 41. This breaks the two electric circuits —the first circuit comprising terminal 45 — spring 47 — plate 46 — support 41— switch body 40 — and body 19 and the second circuit comprising terminal 45 — spring 47 — plate 46 — support 41 — spring 49 — plunger 39 — and body 19. The two circuits were formed when the plate 46 contacted with the support 41 as shown in FIG. 2. It should be noted that either of these two electric circuits may be dispensed with, and, if the second circuit is deleted, the spring 49 can be provided with rust proof treatment or the plunger 39 can be made of a single hard plastic material. When the circuits are broken, the electric switch 38 is switched from a conductive condition to a non-conductive condition, and this switching action allows the electric control circuit 51 to turn on alarm lamp 52.

In this instance, moreover, communication is established between the fluid chambers 32 and 36 so that the rear wheel braking fluid pressure in the fluid chamber 32 can be intoduced directly into the rear wheel cylinders 18, thus minimizing reduction in the resultant braking force.

When, on the other hand, the rear wheel braking fluid pressure circuit from the tandem master cylinder 10 to the rear wheel cylinders 18 is damaged so as to allow leakage of the rear wheel braking fluid pressure, the stepped piston 24 is then made to slide downwardly from the position shown in FIG. 2 due to the difference between the front wheel braking fluid pressure and the rear wheel braking fluid pressure. As a result, the plunger 39 of the electric switch 38 is moved rightwardly by the cam action of the other slope of the groove 37 to switch the electric switch from its conductive condition to its nonconductive condition, so that the electric control circuit 51 will again turn on the alarm lamp 52.

As will be easily appreciated from the foregoing description of its construction and operation, the electric switch according to the present invention can be manufactured in a simple and easy manner. More specifically, since the set load of the spring 49 is usually predetermined to be at a relatively high level, it is difficult to accomplish the caulking treatment of the switch body 40 at its right end 40a when the parts of the switch (such as the support 41, the terminal holder 42 or the like) are being pushed to the outside of the switch body 40. According to the present invention, however, the caulking treatment can be simply and effectively carried out because only the weak spring 47 pushes the terminal holder 42 to the outside of the switch body 40 during the caulking treatment of its right end 40a.

Since, moreover, the plunger 39 is constructed to move the plate 46 out of engagement with the support 41 when leakage of fluid pressure takes place in either of the two front and rear wheel braking fluid pressure circuits, it should be appreciated that even when the required precision in dimensions of the switch parts is considerably reduced, the switch will still operate securely and reliably by merely suitably designing the displacement of the plate 46 by the action of the plunger 39.

While the above description and accompanying drawing have presented the preferred embodiments of the present invention, it will be obvious to an individual of ordinary skill that numerous modifications and variations may be made therein without departing from the true spirit and scope of the present invention.

What is claimed is:

1. In a braking fluid pressure fault alarm device for a vehicular dual brake system, including a fluid control body having a cylindrical passageway defined therein, a piston slidably inserted in said cylinder and receiving a plurality of oppositely exerting braking fluid pressures, said piston adapted for sliding movement from an initial inoperative position to a second operative position in response to leakage of one of the braking fluid pressures, and an electric alarm circuit having alarm signal means for generating an alarm signal when said electric alarm circuit is deenergized, the improvement comprising:

an electric switch in engagement with said piston for being switched from a normal conductive condition to an actuated nonconductive condition in response to the sliding movement of said piston for deenergizing said electric alarm circuit, said electric switch including a switch body screwed into said fluid control body and being in electrical contact therewith, said switch body being formed with a stepped through bore having larger and smaller diameter portions; an annular plate-like support fixedly mounted in the larger diameter portion of said switch body and being in electrical contact therewith; an electrically insulating terminal holder fixedly mounted in the larger diameter portion of said switch body and having a recess facing said support; an electrically conductive plate disposed in the recess of said terminal holder; a terminal fixedly mounted in a central portion of said terminal holder, a first spring disposed in the recess of said terminal holder for biasing said plate into abutting engagement with said support and for providing electrical contact between said terminal and said plate, said first spring being weak; a plunger inserted in the smaller diameter portion of said switch body and having an electrically insulating end portion; and a second spring interposed between said plunger and said support and in a state of compression; said second spring being loaded at a preset level so as to bias said plunger in the direction away from said plate, whereby said plunger can be moved, in response to the sliding movement of said piston from an inoperative position to an operative position, toward said plate to bring its end portion into abutting engagement with said plate to thereby separate said plate from said support.

2. An electrical switch for use in a fault alarm device comprising:

an electrically conductive switch body having a stepped continuous longitudinal passageway defined therein, said passageway including portions having smaller and larger transverse dimensions;

an electrically conductive annular supporting element being fixedly disposed in said larger passageway portion and being in electrical contact with said body;

an electrically insulating terminal holder fixedly disposed in said larger passageway portion of said body and having a recess facing said supporting element;

an electrically conductive plate disposed in the recess of said terminal holder;

a terminal mounted on said terminal holder;

electrically conductive first biasing means contacting said terminal at one end and said plate at another end being disposed in said recess for biasing said plate against said supporting element, said biasing means also providing electrical contact between said terminal and plate;

a plunger disposed in said smaller passageway portion and having an electrical insulating end portion;

second biasing means being disposed between said plunger and said supporting element for biasing said plunger away from said plate during a normally closed position of said switch; and wherein said plunger includes a second end portion for moving said plunger to force said plate away from said supporting element so as to open said switch.

3. The switch of claim 2 wherein said stepped passageway is cylindrical.

4. The switch of claim 2 wherein said insulating end portion, when forced by said second plunger end portion, extends through an annular opening of said supporting element against said plate.

5. The switch of claim 2 wherein said first biasing means is a weak metal spring and said second biasing means is a spring having greater compressive force than said weak metal spring, said spring of said second biasing means being in compression in the normally closed position of said switch.

6. In combination with the switch of claim 2, a pressure fault alarm device for a vehicular plural brake system comprising:
   a fluid control body having a cylindrical passageway defined therein;
   a piston slidably inserted in said cylindrical passageway and receiving a plurality of oppositely exerting brake fluid pressures, said piston adapted for sliding movement from an initial inoperative position to an operative position in response to fluid leakage in said system, said piston including means for moving said second end portion of said plunger; and
   an electric alarm circuit coupled to said switch having alarm signal means for generating an alarm signal in response to the opening of said switch.

7. The alarm device of claim 6 wherein said piston includes camming means for moving the second end portion of said plunger to open said switch.

8. The alarm device of claim 6 wherein said piston includes a V-shaped portion and said second end portion of said plunger is inserted in the opening of said V-shaped portion in the inoperative position of said piston, a side portion of said V-shaped portion moving the plunger during the operative position of said piston by camming action.

9. The alarm device of claim 6 wherein said brake system is a dual brake system and there exist two opposing brake fluid pressures on the piston, one from one set of brakes and the other from another set of brakes.

* * * * *